(12) United States Patent
White

(10) Patent No.: US 8,326,636 B2
(45) Date of Patent: Dec. 4, 2012

(54) USING A PHYSICAL PHENOMENON DETECTOR TO CONTROL OPERATION OF A SPEECH RECOGNITION ENGINE

(75) Inventor: Marc White, Charlotte, NC (US)

(73) Assignee: Canyon IP Holdings LLC, Wilmington, DE (US)

( * ) Notice: Subject to any disclaimer, the term of this patent is extended or adjusted under 35 U.S.C. 154(b) by 993 days.

(21) Appl. No.: 12/355,319

(22) Filed: Jan. 16, 2009

(65) Prior Publication Data

US 2009/0182560 A1 Jul. 16, 2009

Related U.S. Application Data

(60) Provisional application No. 61/021,335, filed on Jan. 16, 2008, provisional application No. 61/038,046, filed on Mar. 19, 2008, provisional application No. 61/041,219, filed on Mar. 31, 2008.

(51) Int. Cl.
*G10L 21/00* (2006.01)
(52) U.S. Cl. ...................................................... 704/275
(58) Field of Classification Search .................... 704/275
See application file for complete search history.

(56) References Cited

U.S. PATENT DOCUMENTS

| 5,621,858 | A | * | 4/1997 | Stork et al. ..................... 704/232 |
| 5,675,507 | A | | 10/1997 | Bobo, II |
| 5,884,257 | A | * | 3/1999 | Maekawa et al. ............. 704/248 |
| 5,974,413 | A | | 10/1999 | Beauregard et al. |
| 6,006,175 | A | * | 12/1999 | Holzrichter .................... 704/208 |
| 6,173,259 | B1 | | 1/2001 | Bijl et al. |
| 6,219,638 | B1 | | 4/2001 | Padmanabhan et al. |
| 6,490,561 | B1 | | 12/2002 | Wilson et al. |
| 6,532,446 | B1 | | 3/2003 | King |

(Continued)

FOREIGN PATENT DOCUMENTS

EP 1274222 A2 1/2003

(Continued)

OTHER PUBLICATIONS

Information Disclosure Statement (IDS) Letter Regarding Common Patent Application(s), dated Jul. 21, 2011.

(Continued)

*Primary Examiner* — Michael N Opsasnick
(74) *Attorney, Agent, or Firm* — Knobbe Martens Olson & Bear LLP

(57) ABSTRACT

A transmission device such as a cell phone or other mobile communication device includes a physical phenomenon detection device to perform a "push to talk" function by detecting the occurrence of a particular physical phenomenon and using such detection to start and stop recording an utterance for subsequent analysis by a speech recognition engine. A method of controlling operation of a speech recognition engine in response to detection of a physical phenomenon includes detecting or sensing, via a physical phenomenon detection unit, a predetermined physical phenomenon representative of an intent to invoke operation of a speech recognition engine. In response to the detection or sensing of the predetermined physical phenomenon, a signal is transmitted to a control unit in a communication device. In response to the receipt of the transmitted signal, the utterance received from a user via the communication device is recorded, and the recorded utterance is provided to a speech recognition engine for operation thereon. The user may thus effectuate operation of the speech recognition engine upon the utterance by causing the physical phenomenon to occur.

10 Claims, 15 Drawing Sheets

U.S. PATENT DOCUMENTS

| | | | |
|---|---|---|---|
| 6,654,448 | B1 | 11/2003 | Agraharam et al. |
| 6,687,339 | B2 | 2/2004 | Martin |
| 6,687,689 | B1 | 2/2004 | Fung et al. |
| 6,775,360 | B2 | 8/2004 | Davidson et al. |
| 6,816,578 | B1 | 11/2004 | Kredo et al. |
| 6,820,055 | B2 | 11/2004 | Saindon et al. |
| 6,895,084 | B1 | 5/2005 | Saylor et al. |
| 7,200,555 | B1 | 4/2007 | Ballard et al. |
| 7,206,932 | B1 | 4/2007 | Kirchhoff |
| 7,225,224 | B2 | 5/2007 | Nakamura |
| 7,233,655 | B2 | 6/2007 | Gailey et al. |
| 7,236,580 | B1 | 6/2007 | Sarkar et al. |
| 7,254,384 | B2 | 8/2007 | Gailey et al. |
| 7,302,280 | B2 | 11/2007 | Hinckley et al. |
| 2003/0008661 | A1 | 1/2003 | Joyce et al. |
| 2003/0050778 | A1 | 3/2003 | Nguyen et al. |
| 2003/0126216 | A1 | 7/2003 | Avila et al. |
| 2003/0144844 | A1* | 7/2003 | Colmenarez et al. ......... 704/273 |
| 2004/0005877 | A1 | 1/2004 | Vaananen |
| 2004/0015547 | A1 | 1/2004 | Griffin et al. |
| 2005/0010641 | A1 | 1/2005 | Staack |
| 2005/0021344 | A1 | 1/2005 | Davis et al. |
| 2005/0080786 | A1 | 4/2005 | Fish et al. |
| 2005/0101355 | A1 | 5/2005 | Hon et al. |
| 2005/0197145 | A1 | 9/2005 | Chae et al. |
| 2005/0288926 | A1 | 12/2005 | Benco et al. |
| 2006/0028556 | A1* | 2/2006 | Bunn et al. ............... 348/211.99 |
| 2006/0052127 | A1 | 3/2006 | Wolter |
| 2007/0115845 | A1 | 5/2007 | Hochwarth et al. |
| 2007/0180718 | A1 | 8/2007 | Fourquin et al. |
| 2007/0239837 | A1 | 10/2007 | Jablokov et al. |
| 2008/0195588 | A1 | 8/2008 | Kim et al. |
| 2008/0261564 | A1 | 10/2008 | Logan |
| 2008/0275864 | A1 | 11/2008 | Kim et al. |
| 2009/0055175 | A1 | 2/2009 | Terrell, II et al. |
| 2009/0076917 | A1 | 3/2009 | Jablokov et al. |
| 2009/0083032 | A1 | 3/2009 | Jablokov et al. |
| 2009/0124272 | A1 | 5/2009 | White et al. |
| 2009/0163187 | A1 | 6/2009 | Terrell, II |
| 2009/0228274 | A1 | 9/2009 | Terrell, II et al. |
| 2009/0240488 | A1 | 9/2009 | White et al. |
| 2009/0248415 | A1 | 10/2009 | Jablokov et al. |
| 2010/0049525 | A1 | 2/2010 | Paden |
| 2010/0058200 | A1 | 3/2010 | Jablokov et al. |

FOREIGN PATENT DOCUMENTS

| | | |
|---|---|---|
| WO | 2006101528 A1 | 9/2006 |

OTHER PUBLICATIONS

Information Disclosure Statement (IDS) Letter Regarding Common Patent Application(s), Dated Jun. 4, 2010.

David H. Kemsley, et al., A Survey of Neural Network Research and Fielded Applications, 1992, in International Journal of Neural Networks: Research and Applications, vol. 2, No. 2/3/4, pp. 123-133. Accessed on Oct. 25, 2007 at http://citeseer.ist.psu.edu/cache/papers/cs/25638/ftp:zSzzSzaxon.cs.byu.eduzSzpubzSzpaperszSzkemsley_92.pdf/kemsley92survey.pdf, 12 pages total.

Transl8it! translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

Web-based Telephony Bridges for the Deaf, Glaser et al., 5 pages total, 2001.

SoftBridge: An Architecture for Building IP-based Bridges over the Digital Divide, Lewis et al., 5 pages total, 2002.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Fielding, et al., Hypertext Transfer Protocol—HTTP/1.1, RFC 2616, Network Working Group, sections 7, 9.5, 14.30, 12 pages total, 1999.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions/ on Jul. 25, 2008, 7 pages total.

Information Disclosure Statement (IDS) Letter Regarding Common Patent Application(s), submitted by Applicant on Jul. 21, 2009.

* cited by examiner

```
POST /Yap/Login HTTP/1.1
Host: www.icynine.com:8080
User-Agent: Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

*FIG. 8*

Login/Login HEADER

| Request Headers | Request Body | Response Body |
|---|---|---|
| User-Agent | NA | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 9*

Yap/Login HEADER

| Request Headers | Request Body | Response Body |
|---|---|---|
| User-Agent | NA | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 10*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (optional) | | |
| Yap-Return-Cells | | |
| Yap-Return-TTS | | |
| Yap-Content-Type | | |
| Yap-Content-Length | | |

Binary Data Field

FIG. 11

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

*FIG. 12*

Returns: an XML Hierarchy containing

- result—the body of result xml
- result-type
- result-code
- result-code-description
- result-text
- result-is-silence
- result-details
- result-conf
- lattice

*FIG. 13*

TTS HEADER

Yap/Login HEADER

| Request Headers | Request Body | Response Body |
|---|---|---|
| User-Agent | NA | TTS Binary Audio Data |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

FIG. 14

CORRECT HEADER

TTS HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

FIG. 15

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 16

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 17

USING A PHYSICAL PHENOMENON DETECTOR TO CONTROL OPERATION OF A SPEECH RECOGNITION ENGINE

CROSS-REFERENCE TO RELATED APPLICATIONS

The present application is a nonprovisional patent application of, and claims priority under 35 U.S.C. §119(e) to, each of the following:
(1) U.S. provisional patent application Ser. No. 61/021,335, filed Jan. 16, 2008 and titled "USING A PHYSICAL PHENOMENA DETECTOR TO START AND STOP RECORDING FOR A SPEECH RECOGNITION ENGINE;"
(2) U.S. provisional patent application Ser. No. 61/038,046, filed Mar. 19, 2008 and titled "CORRECTIVE FEEDBACK LOOP FOR AUTOMATED SPEECH RECOGNITION;" and
(3) U.S. provisional patent application Ser. No. 61/041,219, filed Mar. 31, 2008 and titled "USE OF METADATA TO POST PROCESS SPEECH RECOGNITION OUTPUT."
Each of the foregoing patent applications from which priority is claimed is hereby incorporated herein by reference in its entirety.

Additionally, U.S. Patent Application Publication No. US 2007/0239837 is incorporated herein by reference, and each of the following patent applications, and any corresponding patent application publications thereof, are incorporated herein by reference:
(1) U.S. nonprovisional patent application Ser. No. 12/197,213, filed Aug. 22, 2008 and titled "CONTINUOUS SPEECH TRANSCRIPTION PERFORMANCE INDICATION;"
(2) U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES;"
(3) U.S. nonprovisional patent application Ser. No. 12/198,112, filed Aug. 25, 2008 and titled "FILTERING TRANSCRIPTIONS OF UTTERANCES;"
(4) U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF;"
(5) U.S. nonprovisional patent application Ser. No. 12/212,644, filed Sep. 17, 2008 and titled "METHODS AND SYSTEMS FOR DYNAMICALLY UPDATING WEB SERVICE PROFILE INFORMATION BY PARSING TRANSCRIBED MESSAGE STRINGS;"
(6) U.S. nonprovisional patent application Ser. No. 12/212,645, filed Sep. 17, 2008 and titled "FACILITATING PRESENTATION OF ADS RELATING TO WORDS OF A MESSAGE;" and
(7) U.S. nonprovisional patent application Ser. No. 12/344,313, filed Dec. 26, 2008 and titled "VALIDATION OF MOBILE ADVERTISING FROM DERIVED INFORMATION."

Finally, the disclosure of provisional application 60/789,837 is contained in Appendix A attached hereto and, likewise, is incorporated herein in its entirety by reference and is intended to provide background and technical information with regard to the systems and environments of the inventions of the current provisional patent application. Similarly, the disclosure of the brochure of Appendix B is incorporated herein in its entirety by reference.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE PRESENT INVENTION

As described in the above-referenced U.S. patent application Ser. No. 11/697,074, speech recognition is being used in a wide variety of applications, particularly including mobile device applications. Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), content-based spoken audio search (e.g., finding a podcast where particular words were spoken), and most recently, generation of text messages. A method disclosed in U.S. patent application Ser. No. 11/697,074 includes the steps of initializing a client device so that the client device is capable of communicating with a backend server; recording an audio message in the client device, transmitting the recorded audio message from the client device to a backend server through a client-server communication protocol, converting the transmitted audio message into the text message in the backend server, and sending the converted text message back to the client device. The text message comprises a Short Message Service ("SMS") text message.

One common problem encountered in mobile device applications using speech recognition is the frequent presence of background noise, such as wind and other environmental noise, nearby speech and sounds, vehicular noise, and the like. For purposes of handling such background noise, the noise may be divided into at least two categories: simultaneous background noise (background noise that occurs while the user of the mobile device is speaking) and non-simultaneous background noise (background noise that occurs before or after the user of the mobile device is speaking).

Simultaneous background noise often requires the use of sophisticated filtering systems and the like, but non-simultaneous background noise is often excluded from treatment by a speech recognition system through the use of a "push to talk" button. The user presses and releases the button to indicate the beginning and end of speech they wish to have recognized by the speech recognition engine. Using this technique improves accuracy and because the engine does not have to attempt to detect start and end of speech.

On most cell phones and other mobile devices one or more physical buttons can be assigned to be used as the push to talk button. However, some mobile devices use touch screens as their only means of input and do not have any physical buttons which can be used for push to talk. For these mobile devices, an alternative to a physical button would be to use a visual on-screen button that the user can press. This is not the best solution though, as it requires the user to physically look at the screen in order to see where the push to talk button is located. One of the benefits of using speech recognition on a mobile device is that the user does not have to be physically looking at the device in order to enter text. Unfortunately, using an on-screen button negates that benefit and can be unsafe for the user if, for example, they want to use speech input while driving.

A growing number of mobile devices are provided or will be provided with means for detecting information about a physical phenomenon, such as proximity, ambient light, vibration, movement, inclination, or the like, that is encountered by the mobile device, and are utilizing this information to enter information into the device. In one example, some mobile devices may be provided with one or more proximity sensors to detect the proximity of a structural portion of the device (such as a slide or flip cover of a cell phone), the proximity of a user's face, ear or hand, or the like. Such proximity sensors may be infrared (IR), inductive, capacitive, magnetic, photoelectric, or the like. In another example, some mobile devices may be provided with one or more ambient light sensor to detect ambient light in a user's environment, to detect sudden light blockages caused by placement of the device against a user's face or hand, or the like. In another example, some mobile devices may be provided with a tilt sensor to detect inclination of mobile device with respect to at least one axis. Such a tilt sensor may incorporate any of a variety of devices, including but not limited to a gyroscope, accelerometer, multi-axis gyroscope, multi-axis accelerometer, or the like.

U.S. patent application Ser. No. 10/899,037, published as Pub. No. US2005/0197145 on Sep. 8, 2005 (the entirety of which is incorporated herein by reference), discloses a mobile phone having vibration/inclination detection means that allow a user to input a phone number without any manipulation of the keypad. The user enters the phone number one digit at a time by physically moving the phone in a predetermined pattern that corresponds to the desired digit. The vibration/inclination detection means are able to recognize numbers from 0-9, and the desired phone number may thus be derived from the detected movements and inclinations according to the predetermined rules.

It has also been proposed that a 3D accelerometer may be incorporated into a mobile phone, wherein the accelerometer recognizes movement of the mobile phone in three dimensional space, and the mobile phone carries out commands according to those calculations. In this arrangement, a user could physically move the mobile phone in a manner that draws a desired character in space, and the motion is monitored by the accelerometer, analyzed to determine the drawn character, and if recognized, the character may be displayed on the screen of the mobile phone.

U.S. patent application Ser. No. 11/649,885, published as Pub. No. US2007/0180718 on Aug. 9, 2007 (the entirety of which is incorporated herein by reference), discloses a method for pre-calibrating a mobile device such that subsequent movement, detected by a tilt sensor, can be prepared to a calibrated state to determine the relationship of the movement to a neutral position.

U.S. patent application Ser. No. 10/162,487, published as Pub. No. US2002/0167488 on Nov. 14, 2002 (the entirety of which is incorporated herein by reference), discloses the use, in a mobile device, of at least one sensor that provides contextual information to the device. The sensor may include a tilt sensor, a proximity sensor, or a gravity switch. When the mobile device receives an incoming message, or notification, the device responds thereto based at least in part upon the contextual information.

Unfortunately, none of these mobile devices use physical phenomenon devices to trigger the operation of a speech recognition system. Thus, a need exists for a mobile device that utilizes a physical phenomenon sensor, such as a tilt sensor, proximity sensor, or the like, to indicate when a user wants to begin and end recording audio for the speech recognition engine.

SUMMARY OF THE PRESENT INVENTION

This invention disclosure describes a method for using a physical phenomenon sensor, such as a tilt proximity sensor, that is built into a mobile phone or other communication device as a means of triggering the starting and stopping of recording audio for use with a speech recognition engine. This becomes particularly useful with cell phones and other mobile devices which do not have physical buttons (e.g., those with touch screens only).

According to one aspect, the present invention is a method of controlling operation of a speech recognition engine in response to detection of a physical phenomenon, including: detecting or sensing, via a physical phenomenon detection unit, a predetermined physical phenomenon representative of an intent to invoke operation of a speech recognition engine; in response to the detection or sensing of the predetermined physical phenomenon, transmitting a signal to a control unit in a communication device; in response to the receipt of the transmitted signal, recording an utterance received from a user via the communication device; and providing the recorded utterance to a speech recognition engine for operation thereon; wherein the user may effectuate operation of the speech recognition engine upon the utterance by causing the physical phenomenon to occur. In a feature of this aspect, the detecting or sensing step includes detecting or sensing the predetermined physical phenomenon without use of key elements.

In another feature of this aspect, providing the recorded utterance to the speech recognition engine for operation thereon includes providing the recorded utterance to the speech recognition engine for recognition as a voice command.

In another feature of this aspect, providing the recorded utterance to the speech recognition engine for operation thereon includes providing the recorded utterance to the speech recognition engine for transcription into text. In a further feature, the method further includes, upon receiving transcribed text from the speech recognition engine, presenting the transcribed text to the user.

In another feature of this aspect, the physical phenomenon detection unit is included in the communication device.

In another feature of this aspect, the physical phenomenon detection unit is not included in the communication device.

In another feature of this aspect, the physical phenomenon is a first physical phenomenon, and the method also includes: detecting or sensing, via the physical phenomenon detection unit, a predetermined second physical phenomenon representative of an intent to further control the operation of a speech recognition engine; and in response to the detection or sensing of the predetermined second physical phenomenon, terminating the step of recording the utterance received from the user via the communication device. In a further feature, the utterance includes an activated portion recorded after the first physical phenomenon is detected or sensed but before the second physical phenomenon is detected or sensed, and wherein operation of the speech recognition engine on the utterance is limited to the activated portion of the utterance. In still further features, the first physical phenomenon is a first occurrence of the predetermined physical phenomenon and the second physical phenomenon is a second occurrence of the same predetermined physical phenomenon; the second physical phenomenon is different from the first physical phenomenon; and/or detecting or sensing the first physical phenomenon is carried out via a first proximity sensor and detecting or sensing the second physical phenomenon is carried out via a second proximity sensor. In another feature of this aspect, detecting or sensing includes detecting or sensing the proximity of an object.

In another feature of this aspect, detecting or sensing includes detecting or sensing the proximity of an object. In further features, detecting or sensing the proximity of the object includes detecting or sensing the proximity of an element of the communication device, or detecting or sensing the proximity of the object includes detecting or sensing the proximity of a human body part. In a further feature of the latter case, detecting or sensing the proximity of the human body part includes detecting or sensing heat radiated from a human face.

In another feature of this aspect, detecting or sensing includes detecting or sensing the detection unit being tilted relative to a first axis. In a further feature, detecting or sensing further includes detecting or sensing the detection unit being tilted relative to a second axis.

In another feature of this aspect, the method further includes a step of, prior to detecting or sensing, via the predetermined physical phenomenon representative of an intent to invoke operation of a speech recognition engine, receiving an input representative of an intent to place the communication device in a standby state such that subsequent detecting or sensing of the predetermined physical phenomenon is enabled. In a further feature, receiving an input includes receiving the input via one or more key element provided in the communication device.

The present invention according to another aspect is a method of using a physical phenomenon detection unit in a communication device to control operation of a speech recognition engine, including: manipulating a communication device so as to cause a first predetermined physical phenomenon to occur, thereby activating one or more elements of the communication device for recordation of an utterance; speaking an utterance for receipt by the communication device; manipulating a communication device so as to cause a second predetermined physical phenomenon to occur, thereby deactivating the one or more elements of the communication device, wherein the utterance includes an activated portion received by the communication device while the one or more elements are activated for recording; and causing the activated portion of the utterance to be operated upon by a speech recognition engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 8 is a typical header section of an HTTP request from the client in the commercial implementation;

FIG. 9 illustrates exemplary protocol details for a request for a location of a login server and a subsequent response;

FIG. 10 illustrates exemplary protocol details for a login request and a subsequent response;

FIG. 11 illustrates exemplary protocol details for a submit request and a subsequent response;

FIG. 12 illustrates exemplary protocol details for a results request and a subsequent response;

FIG. 13 illustrates exemplary protocol details for an XML hierarchy returned in response to a results request;

FIG. 14 illustrates exemplary protocol details for a text to speech request and a subsequent response;

FIG. 15 illustrates exemplary protocol details for a correct request;

FIG. 16 illustrates exemplary protocol details for a ping request;

FIG. 17 illustrates exemplary protocol details for a debug request; and

DETAILED DESCRIPTION OF THE PREFERRED EMBODIMENTS

Figure 1:
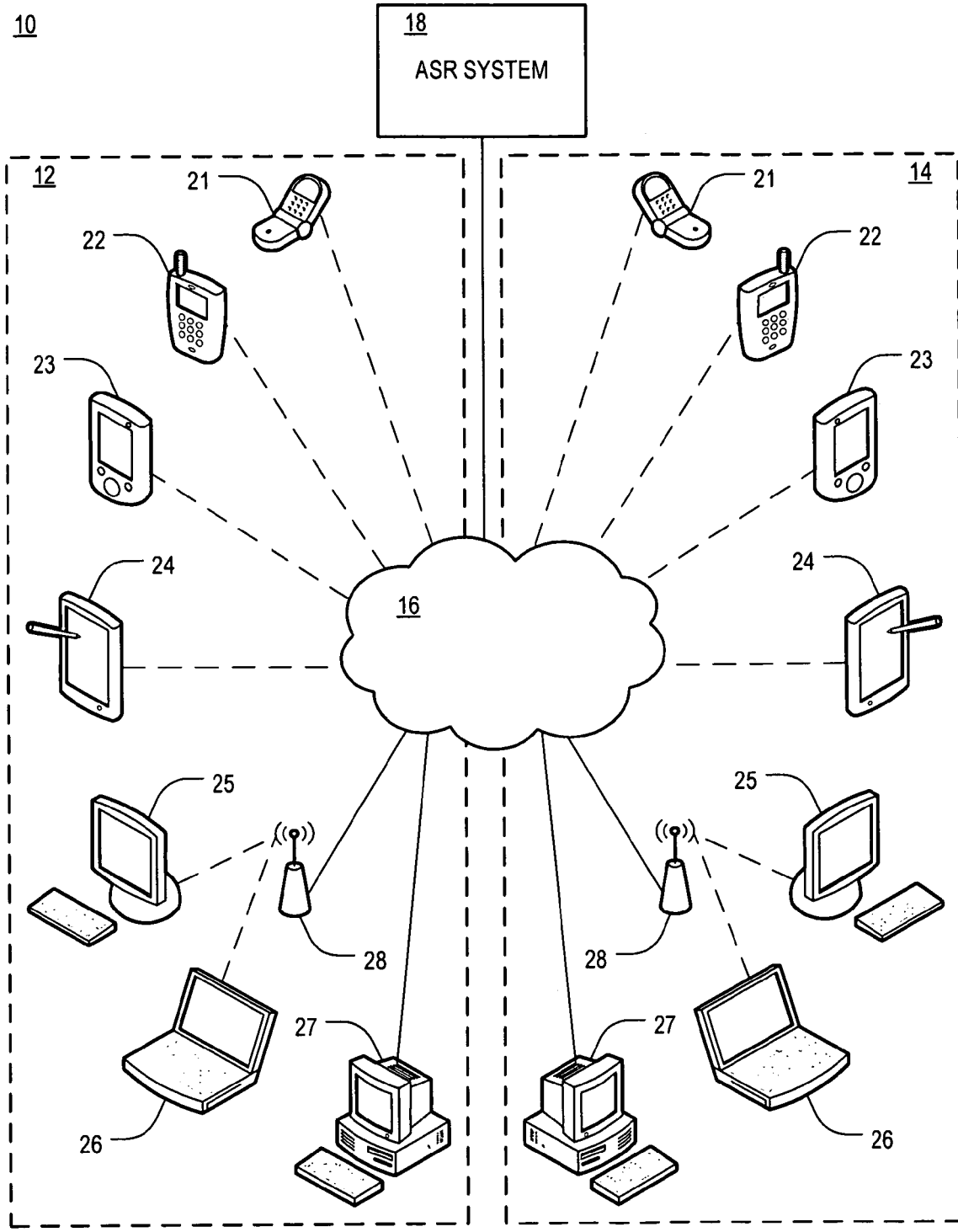
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an automatic speech recognition ("ASR") system 18, including an ASR engine. Transmitting and receiving devices 12,14 may include cell phones 21, smart phones 22, PDAs 23, tablet notebooks 24, various desktop and laptop computers 25,26,27, and the like. One or more of the devices 12,14, such as the illustrated iMac and laptop computers 25,26, may connect to the network systems 16 via wireless access point 28. The various transmitting and receiving devices 12,14 (one or both types of which being sometimes referred to herein as "client devices") may be of any conventional design and manufacture.

Figure 2:
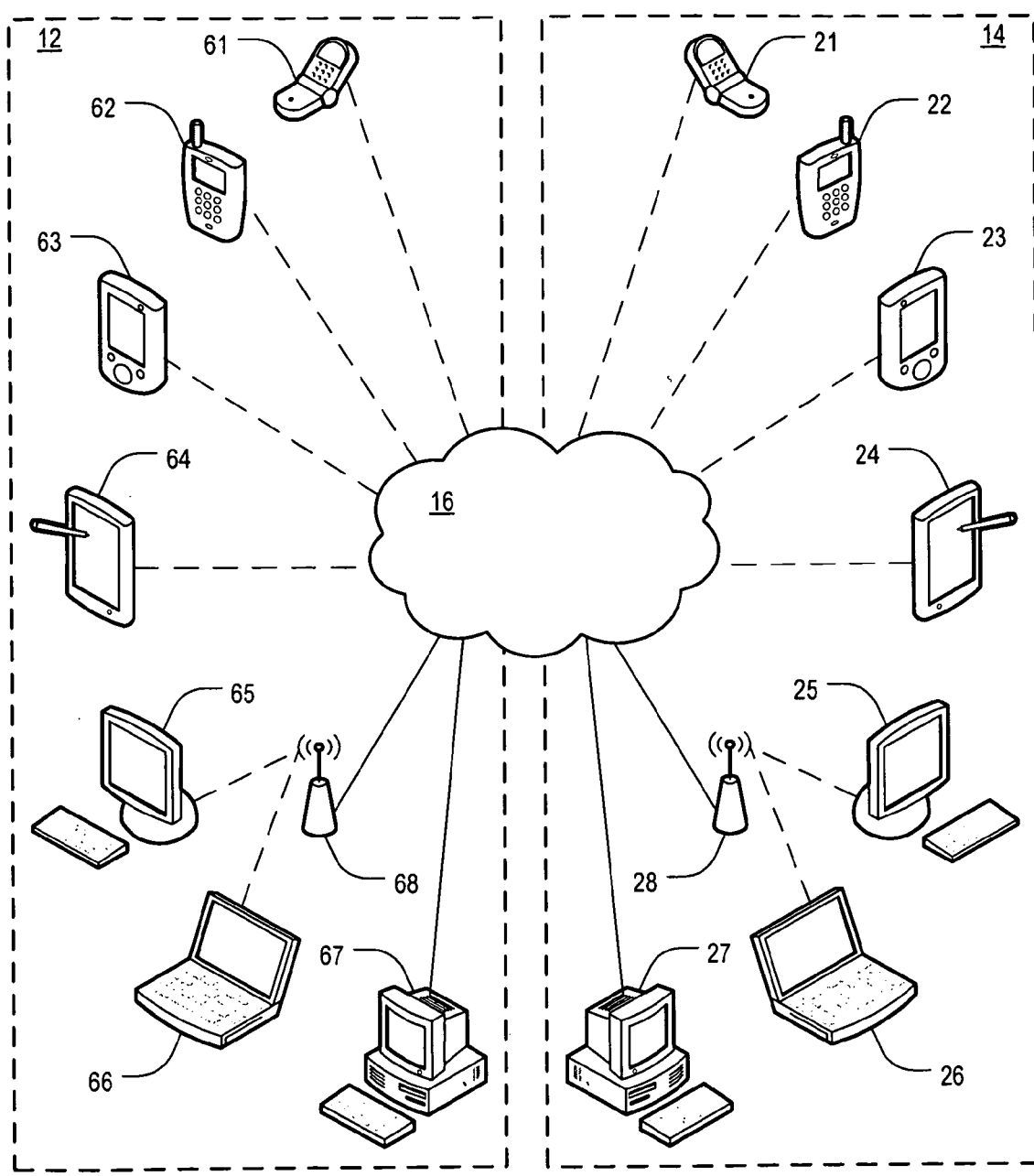
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

Figure 3:
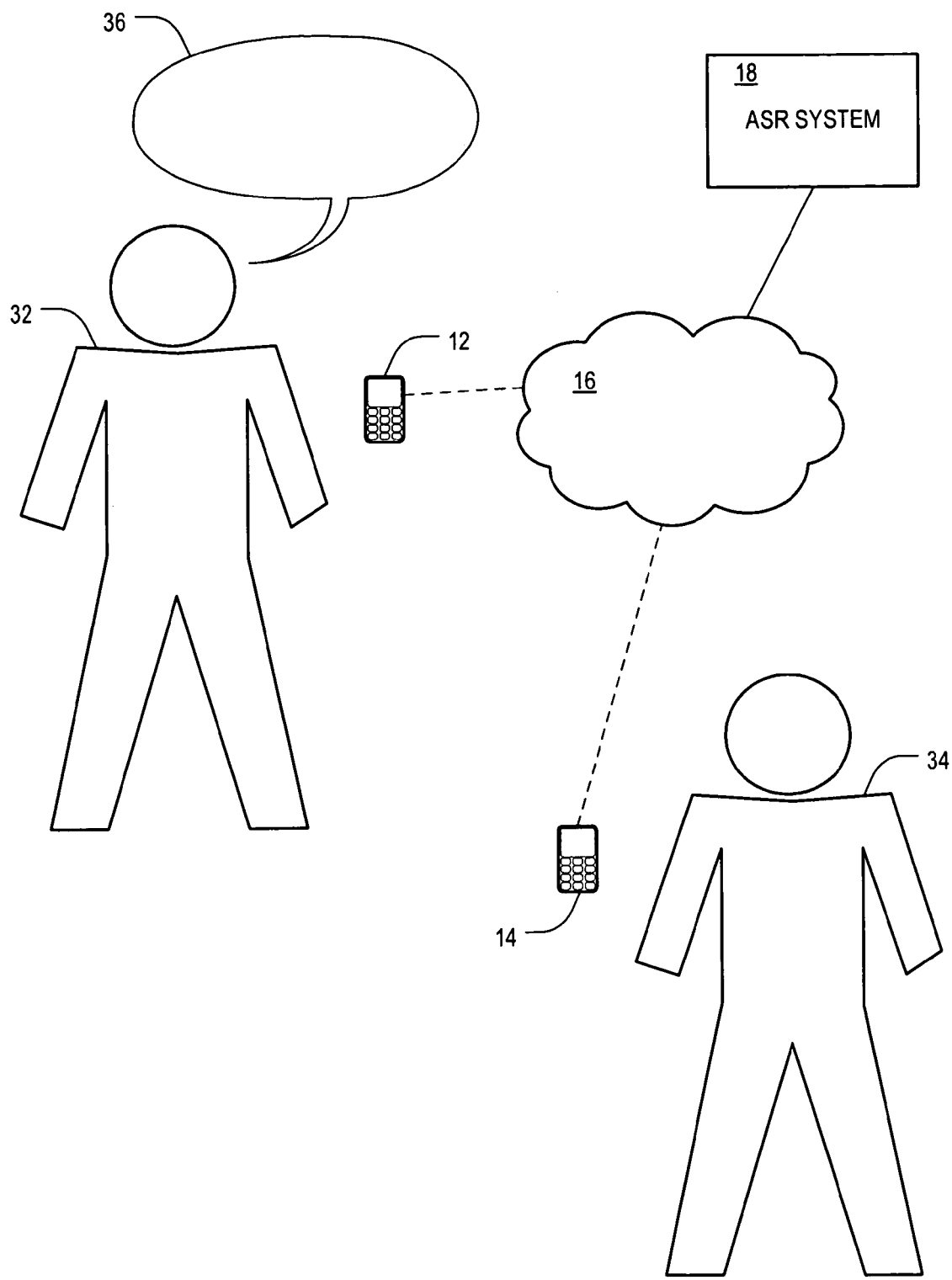
FIG. 3 is a block diagram illustrating communications between two users via a portion of the communication system of FIG. 1.

FIG. 3 is a block diagram illustrating communications between two users 32,34 via a portion of the communication system 10 of FIG. 1. As shown therein, a first user 32, sometimes referred to herein as a "transmitting user," is communicating with a second user 34, sometimes referred to herein as a "receiving user," by way of respective transmitting and receiving devices 12,14. More particularly, the transmitting user 32 uses his transmitting device 12 to initiate text messages that are transmitted to, and received by, the receiving user 34 via her receiving device 14. In the context of text messaging, the transmitting user 32 may send text messages, using his transmitting device 12, via SMS, and the receiving user 34 receives text messages, sent via SMS, on her receiving device 14. In the context of instant messaging, the transmitting user 32 may send instant messages, via an IM client, using his transmitting device 12, and the receiving user 34 receives instant messages, via an IM client, on his receiving device 14.

In at least some embodiments, the transmitting user 32 in FIG. 3 may generate text messages by speaking into his transmitting device 12 and causing his utterances to be converted to text for communicating to the receiving device 14. One or more systems and methods for carrying out such a process are described, for example, in the aforementioned U.S. Patent Application Pub. No. US 2007/0239837, but are at least partially described herein. More particularly, FIG. 4 may be understood to be a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating or joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiments, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance 36, thus generating an audio message, V1. At this stage, the audio message V1 is recorded in the mobile phone 12. By releasing the button, the recorded audio message V1 is sent to the backend server 160 through the mobile communication service provider 140.

Figure 4:
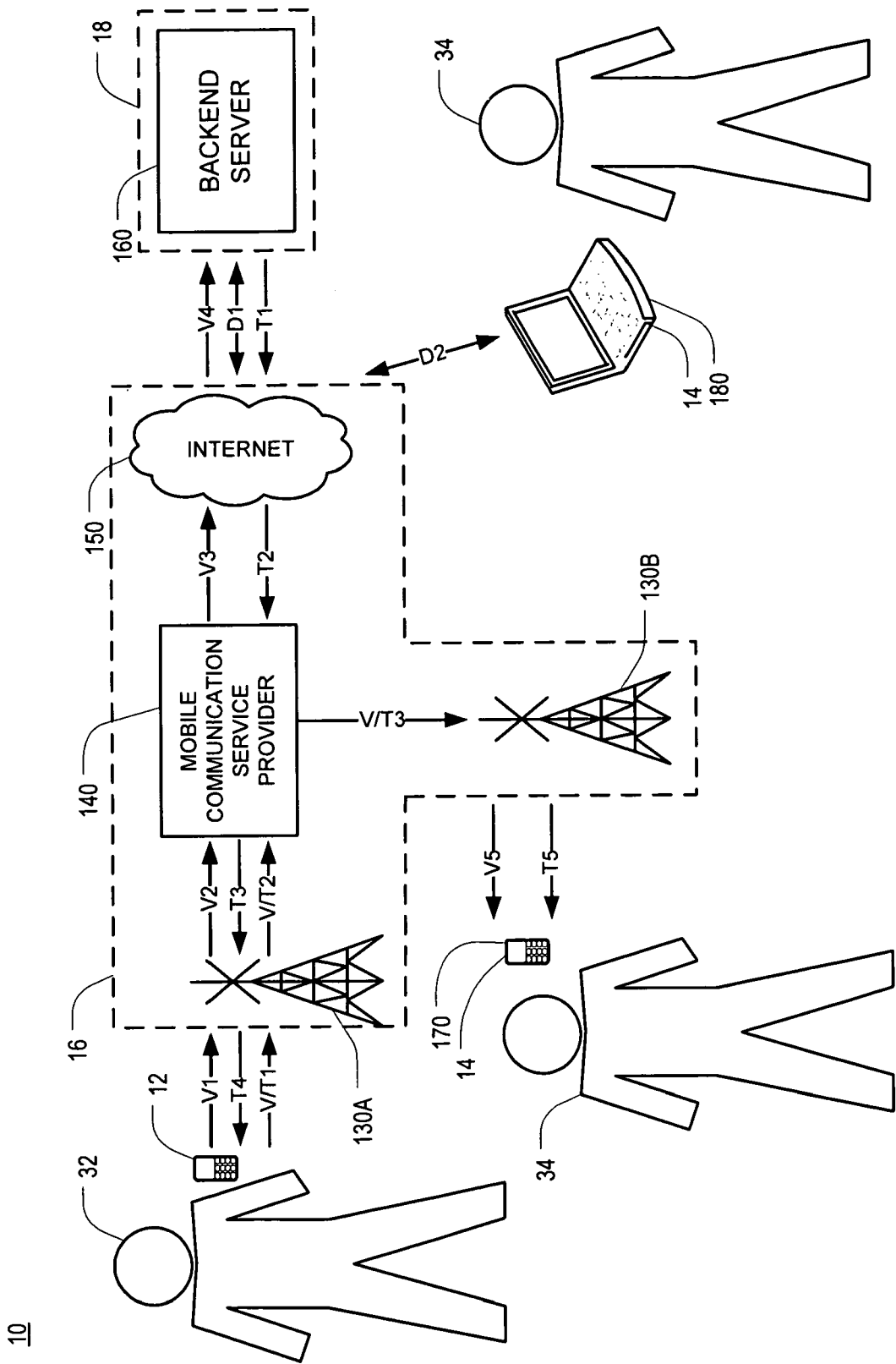
FIG. 4 is a block diagram of an exemplary implementation of the system of FIG. 1.

In the exemplary embodiment of the present invention as shown in FIG. 4, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T2 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system 10 may be utilized to convert an audio message into a text message. In at least one implementation, this may be accomplished by first initializing a transmitting device so that the transmitting device is capable of communicating with a backend server 160. Second, a user 32 speaks to or into the client device 12 so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Still further, in at least one implementation, one or both types of client device 12,14 may be located through a global positioning system (GPS); and listing locations, proximate to the position of the client device 12,14, of a target of interest may be presented in the converted text message.

Furthermore, in converting speech to text, speech transcription performance indications may be provided to the receiving user 34 in accordance with the disclosure of U.S. patent application Ser. No. 12/197,213, entitled "CONTINUOUS SPEECH TRANSCRIPTION PERFORMANCE INDICATION," which, together with any corresponding patent application publications thereof, is incorporated herein by reference.

Additionally, in the context of SMS messaging, the ASR system preferably makes use of both statistical language models (SLMs) for returning results from the audio data, and finite grammars used to post-process the text results, in accordance with the disclosure of U.S. patent application Ser. No. 12/198,112, entitled "FILTERING TRANSCRIPTIONS OF UTTERANCES," which, together with any corresponding patent application publications thereof, is incorporated herein by reference. This is believed to result in text messages that are formatted in a way that looks more typical of how a human would have typed the text message using a mobile device.

Figure 5:
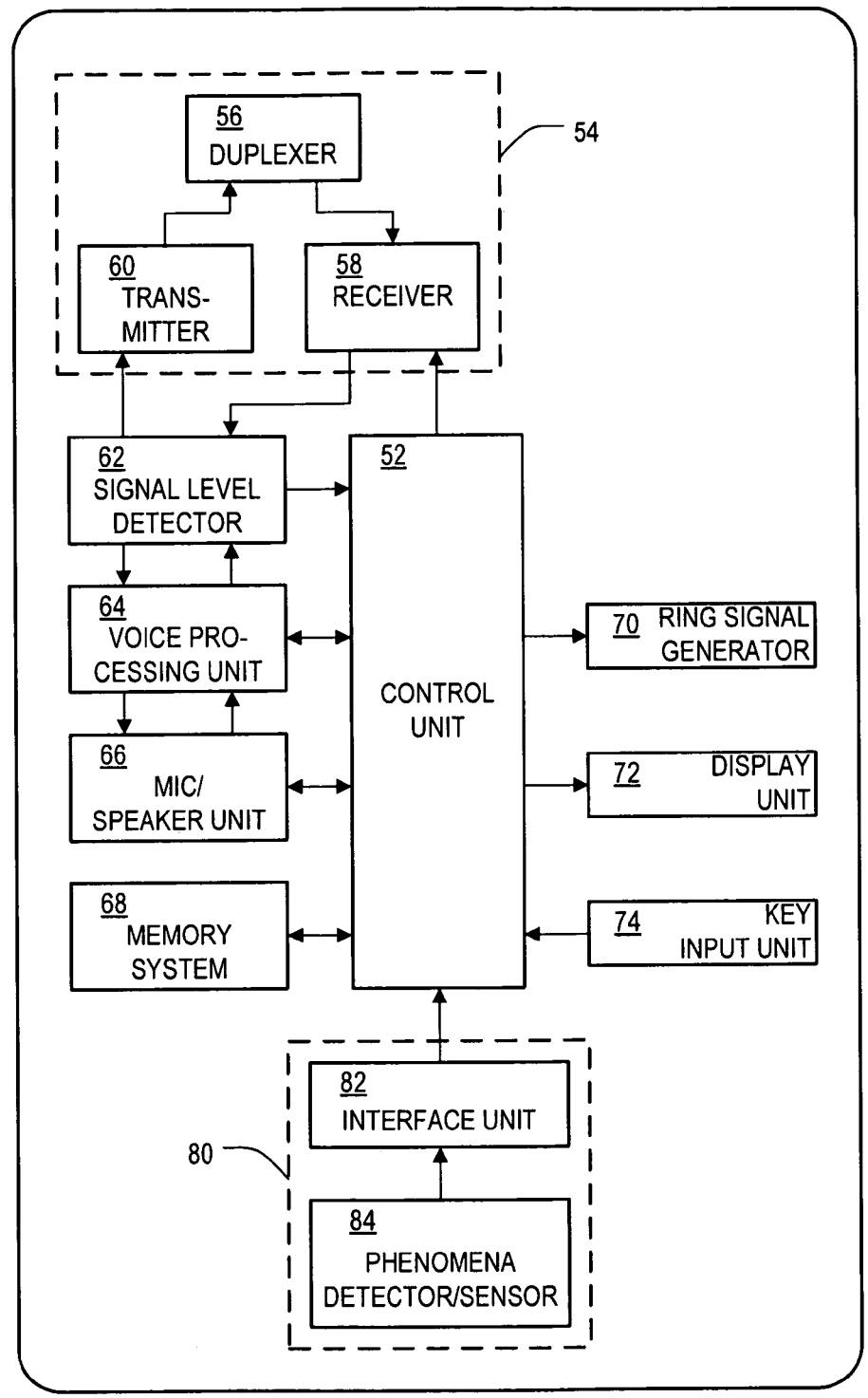
FIG. 5 is a block diagram of a transmission device, such as a cell phone or other mobile communication device, that is equipped with a physical phenomenon detection unit in accordance with a preferred embodiment of the present invention.

FIG. 5 is a block diagram of a communication device 50, such as a cell phone 21 or other mobile communication device, that is equipped with a physical phenomenon detection unit 80 in accordance with a preferred embodiment of the present invention. The communication device 50 may include a control unit 52, a duplex radio 54 that includes a duplexer 56 with antenna (not shown), a receiver 58, and a transmitter 60, a signal level detector 62, a voice processing unit 64, a microphone/speaker unit 66 that includes a microphone and one or more speakers, a memory system 68, a ring signal generator 70, a display unit 72, and optionally, a key input unit 74 having one or more key elements. Although many of these elements may be generally conventional, each element is described in some detail hereinbelow so as to provide a better understanding of the operation of the physical phenomenon detection unit 80 in controlling one or more functions of the communication device 50.

It will be appreciated that the communication device 50 described and illustrated herein may be utilized as either or both of a transmitting device 12 and a receiving device 14. Furthermore, it will be appreciated that although a transmitting device 12 of the type described and illustrated in FIG. 5 and accompanying text may be utilized to communicate with a receiving device 14 of the same type, a transmitting device 12 of the type described and illustrated in FIG. 5 and accompanying text may also be utilized for communications with a conventional receiving device 14 (that is, with a receiving device 14 that is not equipped with, or does not utilize, a physical phenomenon detection unit 80), and likewise that a receiving device 14 of the type described and illustrated in FIG. 5 and accompanying text may also be utilized for communications with a conventional transmitting device 12 (that is, with a transmitting device 12 that is not equipped with, or does not utilize, a physical phenomenon detection unit 80).

Returning to FIG. 5, the memory system 68 includes a Read Only Memory (ROM) for storing control data required for the operation of the control unit 52, a nonvolatile memory for storing data to be stored or removed, such as phone numbers or the like, under the control of the user, and a Random Access Memory (RAM) for temporarily storing data generated during operation of the control unit 52.

For incoming communications, the duplexer 56 receives incoming radio signals via the antenna and outputs them to the receiver 58. The receiver 58 outputs voice signals to the signal level detector 62 and outputs data to the control unit 52, which then causes the ring tone generator 70 to generate a predetermined ring tone. The signal level detector 62 determines the intensity of the voice signal and delivers that information to the control unit 52 and provides the voice signal to the voice processing unit 64. The voice processing unit 64 decodes the signal received from the reception unit 58 and outputs the decoded signal to the speaker in the microphone/speaker unit 66. Data transmissions are handled by the control unit 52 which displays text messages, photos, and the like to the user via the display unit 72.

For outgoing voice transmissions, the voice processing unit 64 receives the user's voice, which has been converted into an electric signal by the microphone, encodes the electric signal, and outputs the encoded signal to the transmission unit 60 via the signal level detector 62. The signal level detector 62 determines the intensity of the outgoing voice signal, delivers that information to the control unit 52, and provides the voice signal to the transmission unit 60. Under the control of the control unit 52, the transmission unit 60 outputs a transmission signal, corresponding to the encoded signal received from the voice processing unit 64, to the duplexer 56 via a set channel, and the transmission signal is then transmitted via the antenna.

When a user wishes to make a call, the user selects a desired phone number from the memory system 68 or inputs a number via manipulation of one or more of the key elements of the key input unit 74, and an outgoing call signal corresponding to the selected number is transmitted. Connection may be established with a corresponding receiving device 14, and voice communication carried out with the user 34 of that device 14, through the duplexer 56, the radio receiver and transmitter 58,60, the voice processing unit 64 and the microphone/speaker unit 66.

When a call signal is received by the communication device 50, a ring signal is generated through the ring signal generation unit 70 under the control of the control unit 52, and a voice call can be accomplished, by the manipulation of one or more of the key elements of the key input unit 74 in response to the ring signal, through the duplexer 56, the radio transmission and reception units 58,60, the voice processing unit 64 and the microphone/speaker unit 66.

Outgoing text communications may be generated in any one of at least two ways. More particularly, text messages may be keyed in manually by the user 32 using the one or more key elements 74 in a conventional manner, or text messages may be created using a speech recognition methodology. Such a methodology is described, for example, in the aforementioned U.S. Pub. No. US 2007/0239837, wherein an utterance 36 produced by the user 32 is received by the microphone, processed by the voice processing unit 64 and recorded in the memory system 68, all under the control of the control unit 52, and then transmitted to the ASR system 18 via the duplex radio 54. The ASR engine converts the utterance 36 to text and transmits the text message back to the originating communication device 50 where it is received by the duplex radio 54 and handled as described previously. Upon receipt of the transcribed text message, the control unit 52 presents the message to the user 32 via the display unit 72 for verification and editing as necessary, and upon approval by the user 32, the finalized text message is deemed to be ready to transmit to a destination communication device such as the receiving device 14 described previously. If not already selected, the user 32 selects a desired phone number or other destination address from the memory system 68 or inputs a number or other address via the one or more key elements of the key input unit 74, and an outgoing message signal corresponding to the number or address is transmitted.

The physical phenomenon detection unit 80 can be implemented using any suitable phenomenon detector or sensor 84, such as an IR proximity sensor, an inductive proximity sensor, capacitive proximity sensor, magnetic proximity sensor or photoelectric proximity sensor detecting proximity, an ambient light sensor detecting light, a geomagnetic sensor detecting earth magnetism, a single-axis or multi-axis gyroscope detecting inclination, an accelerometer detecting acceleration, a vibration detector detecting vibration, or the like, including any such detector or sensor device described in any of the patent applications incorporated by reference herein. Such detectors and sensors may sense phenomena relative to one or more than one axis, or may sense phenomena only within a particular range such as inclination from 45° to 90°. The detection unit 80 is preferably located inside the housing of the communication device 50, though in some embodiments the detection unit 80 may be external. The detection unit 80 may further incorporate more than one sensor 84; the various sensors 84 may be of the same type or of different types. In at least some embodiments, an interface unit 82 receives one or more input signals from each sensor 84 in the detection unit 80 and uses predetermined logic to provide one or more output signals to the control unit 52. Alternatively, the control unit 52 is programmed or otherwise arranged to sort through the signals provided by an interface unit 82. Further, in at least some embodiments, multiple detection units 80 are provided, each communicatively connected to the control unit 52 by a separate interface unit 82. In still other embodiments, no interface unit 82 is provided, and the control unit 52 receives signals directly from each detection unit 80.

The communication device 50 described above may allow the user 32 to execute a "push to talk" function using two different methods. If a key input unit 74 having one or more key elements is provided, then a user 32 wishing to make an utterance 36 that is to be recognized and converted into text may use a generally conventional method in which the user 32,34 merely presses or otherwise triggers one or more key element in the key input unit 74 just before speaking, and either pressing the same button again, releasing the button if it was held, or pressing a different button, as applicable, when the user 32,34 is finished speaking. Typically, the "push to talk" function is functionally implemented in the communication device 50 by activating the microphone and subsequently deactivating the microphone, with any utterance 36 that the microphone receives, while activated, is recorded, transmitted or the like. However, other device functions could instead or additionally be activated, such as a recording function, a transmitting function, or the like.

Whether or not the key input unit 74 is provided or includes a designated or selectable physical button or buttons for carrying out the "push to talk" function, the physical phenomenon detection unit 80 offers a second method wherein the user 32 manipulates the position, orientation, or any other detectable physical state of the communication device 50, or more particularly of the detection unit 80, so as to trigger the detection unit 80 in a predetermined way. For example, the detection unit 80 may utilize an IR proximity sensor 84 that is tuned to detect the heat from a user's face, such as might be detected if the device 50 was held against the user's face while speaking into the microphone of the device 50, and to cause a first signal to be generated and sent, via the interface unit 82, to the control unit 52 when the sensor 84 detects the appropriate amount of heat and to generate a second signal when the communication device 50 is moved away from the user's face. Using such a detection unit 80, the user 32 may, when he or she is ready to trigger the recognition of a particular utterance 36, move the communication device 50 against his or her face, to a natural speaking position, to initiate the "push to talk" function and subsequently remove the communication device 50 from his or face to terminate the "push to talk" function. In another example, if the detection unit 80 utilizes a multi-axis tilt sensor 84 that is preset to cause a first signal to be generated and sent, via the interface unit 82, to the control unit 52 when the communication device 50 is moved so it is approximately vertical relative to a first axis and somewhat tilted (e.g., at a 30°-45° angle) relative to a second axis, and to generate a second signal when the communication device 50 is moved out of that position, then the user 32 may, when he or she is ready to trigger the recognition of a particular utterance 36, move the communication device 50 into the described position or orientation to initiate the "push to talk" function and subsequently remove the communication device 50 from that position or orientation to terminate the "push to talk" function.

It will be apparent that any position or orientation (or in the case of other types of sensors 84, the occurrence of any suitable physical phenomenon) may be selected to initiate and terminate the "push to talk" function, though the selected position, orientation or other phenomenon should preferably be selected to be convenient for the user 32 to move or enter, and more preferably should be relatively natural and intuitive for the user 32. For example, the above-described physical position or orientation (approximately vertical relative to a first axis and somewhat tilted relative to a second axis) may be selected to approximate the position or orientation a cell phone 21 is often held by a user 32 when the user 32 is holding the cell phone 21 to his ear and is speaking into the cell phone 21. It will be appreciated that any of the movements or other physical triggering means described in any of the referenced applications may likewise be utilized. For example, the user may move the communication device 50 in a certain predetermined way in space to activate the "push to talk" function and the same or different predetermined way to deactivate the "push to talk" function.

Further, it will be appreciated that a first physical phenomenon may be utilized to place the communication device into a "standby" state wherein a second physical phenomenon, subsequent to the first, activates the "push to talk" function. Of course, the communication device 50 may alternatively be placed into the "standby" state using the key elements of the key input unit 74, if provided, or using a touch screen or other means.

Figure 18A:
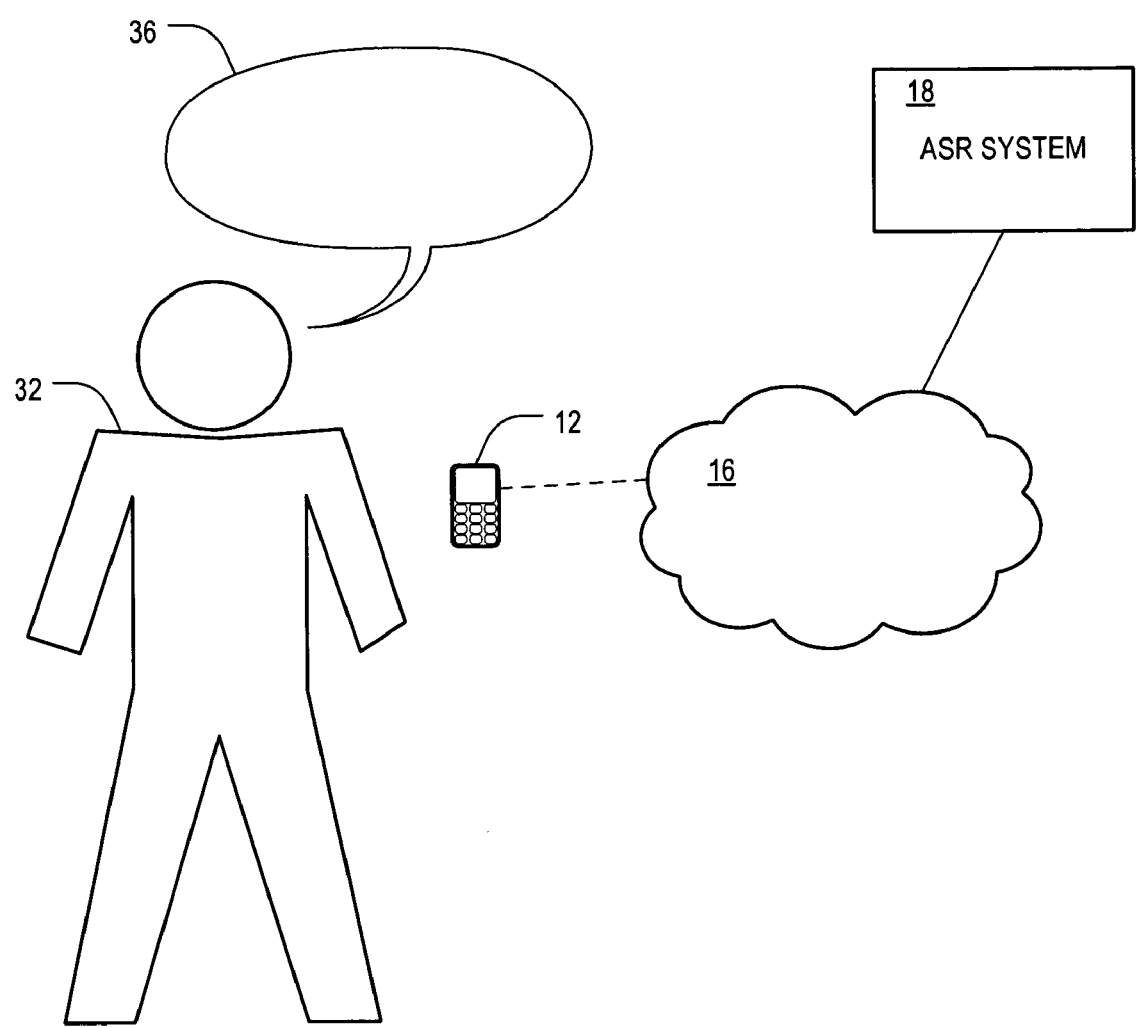
FIGS. 18A and 18B are block diagrams illustrating the use of an utterance as a voice command to control a communication device of FIG. 1 and FIG. 2, respectively.
Figure 18B:
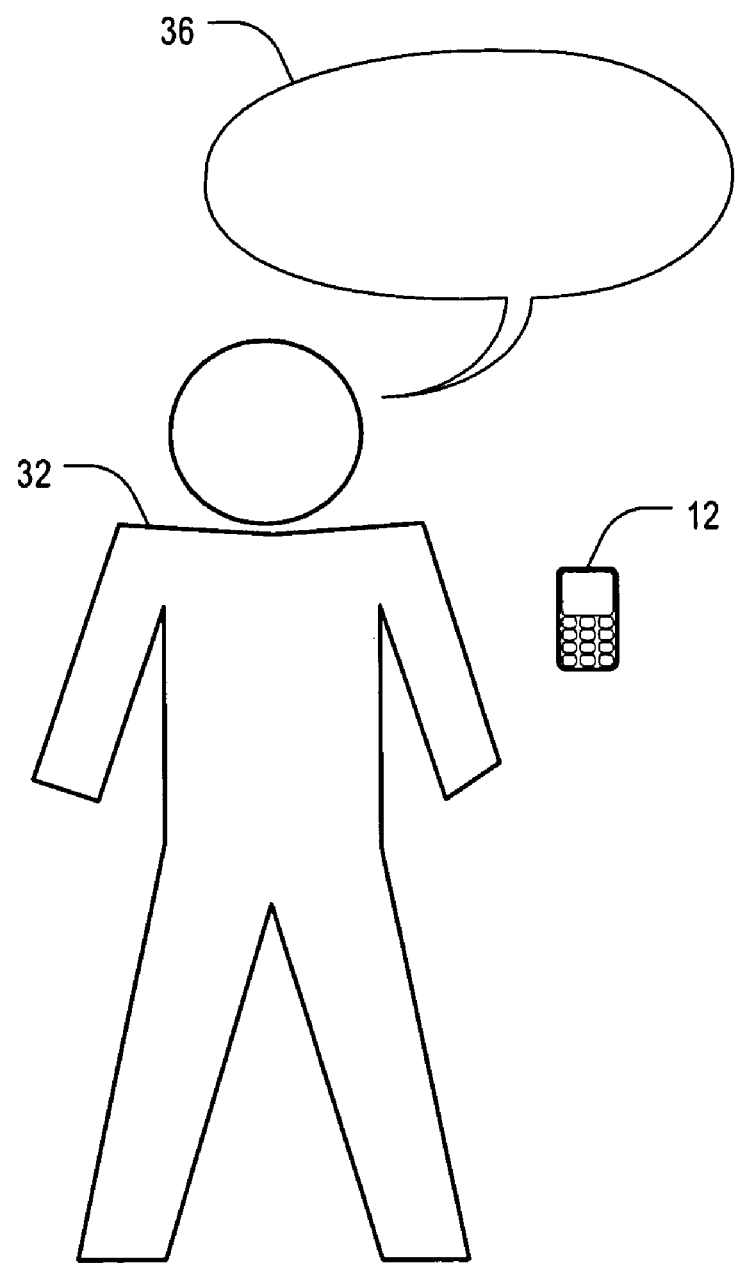

Notably, the speech to be recognized may be a voice command for the device 50, an utterance 36 to be converted to text, a message to be transcribed, or any other known or future-developed speech recognition application, including those mentioned previously. For example, FIGS. 18A and 18B are block diagrams illustrating the use of an utterance as a voice command to control a communication device 12 of FIG. 1 and FIG. 2, respectively. In particular, an utterance may be recognized indirectly, via the ASR system 18 of FIGS. 1 and 18A, or directly, by the ASR-equipped communication device of FIGS. 2 and 18B. In either case, the physical phenomenon detection unit 80 may be utilized to control the acquisition of the utterance by the communication device 50, as described previously.

An utterance 36 may be converted to text in accordance, for example, with the disclosure of the aforementioned U.S. Pub. No. US 2007/0239837. The device 50 preferably presents an indication to the user 32, for purposes of verification, that the particular speech recognition operation being carried out has been carried out successfully. For example, for voice commands, the device 50 preferably communicates audibly with the user 32 to verify that the device 50 correctly understood the command. For speech-to-text conversions made using one of the systems illustrated in FIGS. 1-3, the converted text message is preferably presented to the user 32 on the display unit 72. Of course, other means for verification may be used, and in some cases, verification is not required or may utilized only at the user's option.

COMMERCIAL IMPLEMENTATION

One commercial implementation of the foregoing principles utilizes the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 6:
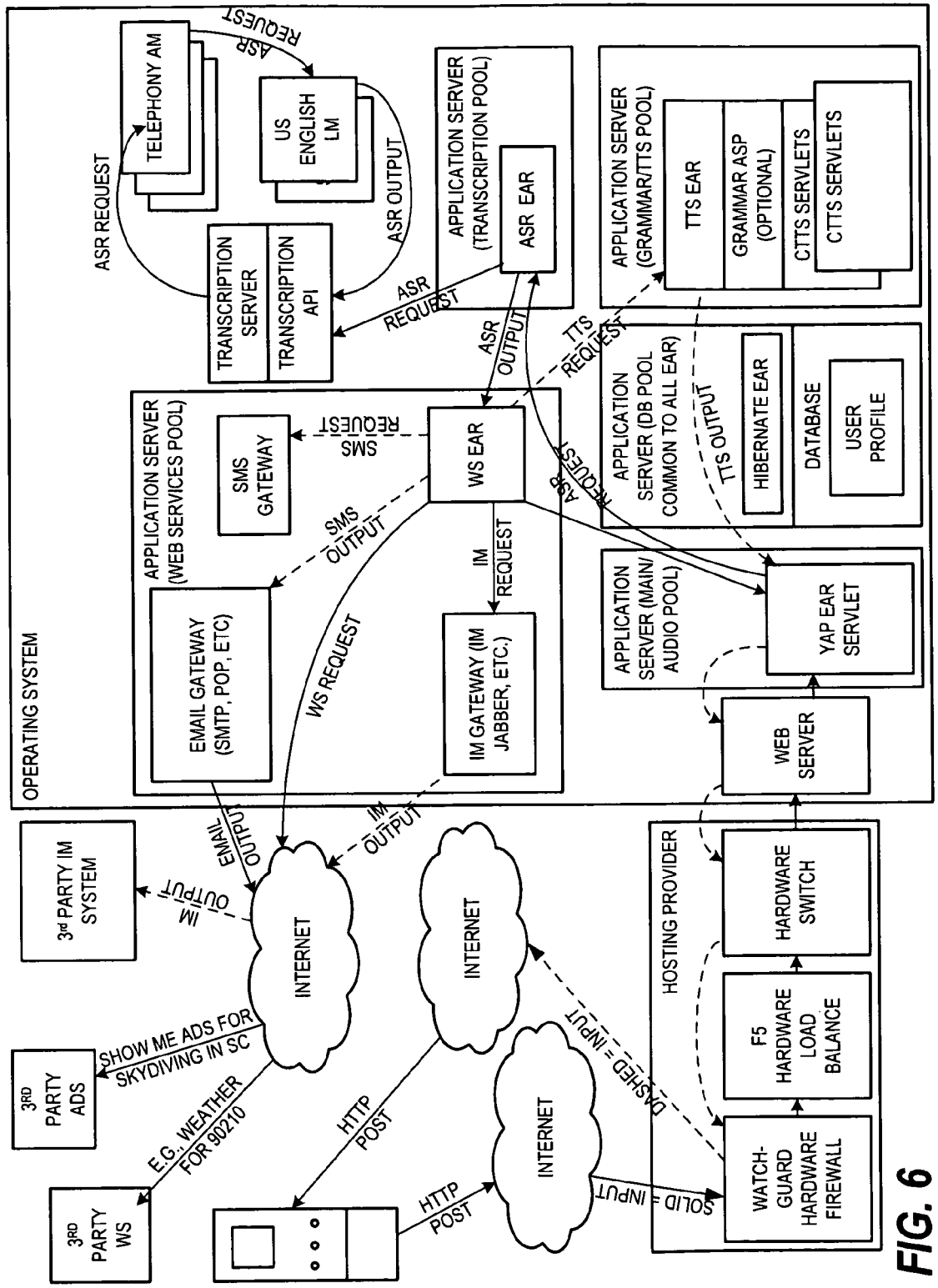
FIG. 6 is a block diagram of the system architecture of one commercial implementation.

FIG. 6 is a block diagram of the system architecture of the Yap commercial implementation. With reference to FIG. 6, the operating system may be implemented in Red Hat Enterprise Linux 5 (RHEL 5); the application servers may include the Websphere Application Server Community Edition (WAS-CE) servers, available from IBM; the web server may be an Apache server; the CTTS servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 7:
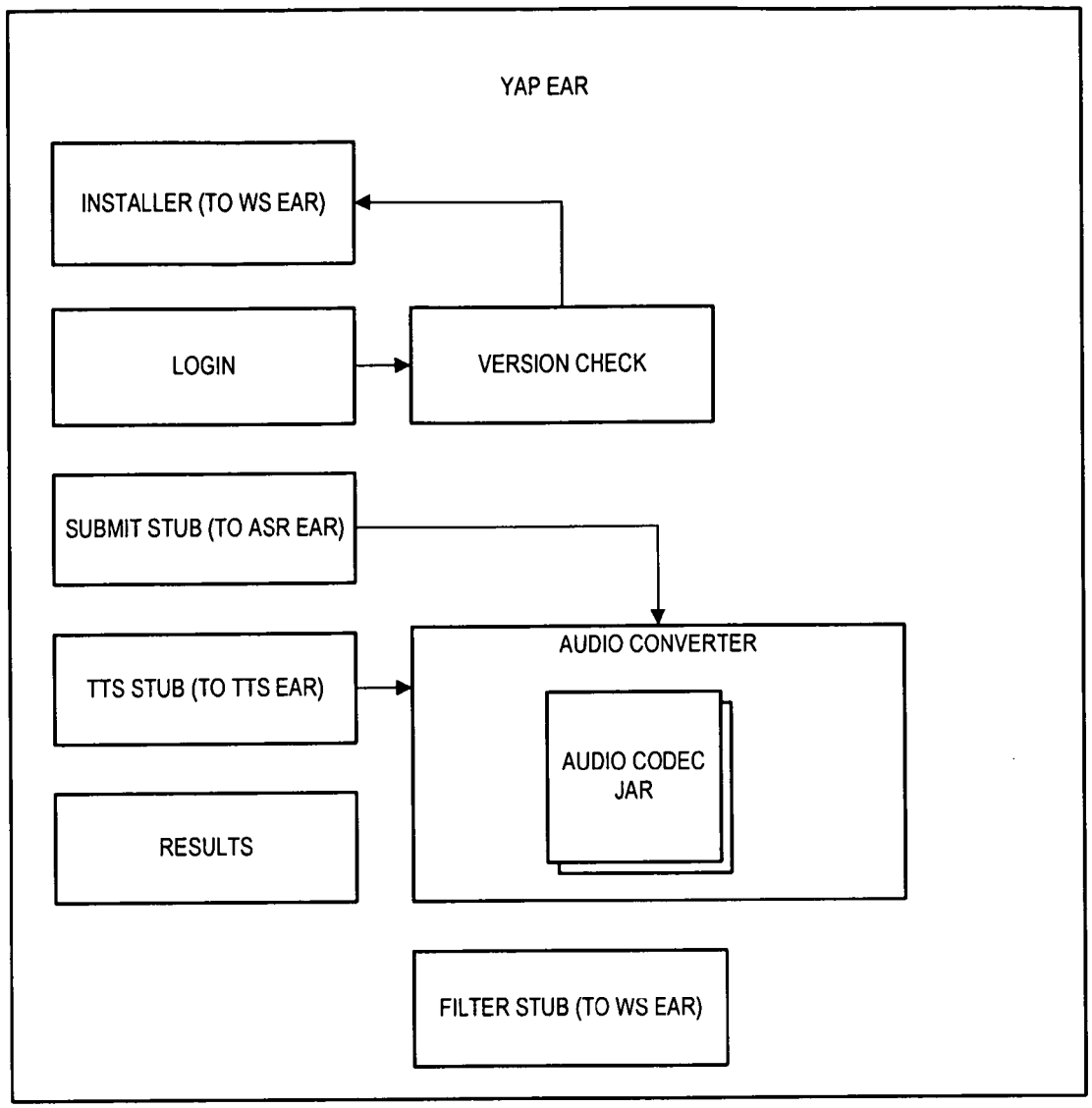
FIG. 7 is a block diagram of a portion of FIG. 6.

FIG. 7 is a block diagram of the Yap EAR of FIG. 6. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 8 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 9A-9D, and accompanying text, of the aforementioned U.S. Patent Application Pub. No. US 2007/0239837.

Usage Process—Install: Installation of the Yap client device application is described in the aforementioned U.S. Patent Application Pub. No. US 2007/0239837 in a subsection titled "Install Process" of a section titled "System Architecture."

Usage Process—Notify: When a Yap client is installed, the install fails, or the install is canceled by the user, the Notify servlet is sent a message by the phone with a short description. This can be used for tracking purposes and to help diagnose any install problems.

Usage Process—Login: When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 9. An HTTP string pointing to a selected login server will be returned in response to this request. It will be appreciated that this selection process functions as a poor man's load balancer.

After receiving this response, a login request is sent. Exemplary protocol details for such a request can be seen in FIG. 10. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:
;jsessionid=C240B217F2351E3C420A599B0878371A All requests from the client simply append this cookie to the end of each request and the session is maintained:
/Yap/Submit;
jsessionid=C240B217F2351E3C420A599B0878371A Usage Process—Submit: After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 11.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 3.

TABLE 3

| Filter Type | Function |
| --- | --- |
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" -> "$120.00") |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2:)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results: The client retrieves the results of the audio by taking the receipt returned from the Submit servlet and submitting it as a request to the Results servlet. Exemplary protocol details for such a request can be seen in FIG. 12. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 13. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS: The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 14. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct: As a means of tracking accuracy and improving future SMS based language models, if the user makes a correction to transcribed text on the phone via the key elements of the key input unit 74 before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 15.

Usage Process—Ping: Typically, web sessions will timeout after a certain amount of inactivity. The Ping servlet can be used to send a quick message from the client to keep the session alive. Exemplary protocol details for such a message can be seen in FIG. 16.

Usage Process—Debug: Used mainly for development purposes, the Debug servlet sends logging messages from the client to a debug log on the server. Exemplary protocol details can be seen in FIG. 17.

Usage Process—Logout: To logout from the Yap server, an HTTP logout request needs to be issued to the server. An exemplary such request would take the form: "/Yap/Logout;jsessionid=1234", where 1234 is the session ID.

User Preferences: In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A system comprising:
a physical phenomenon detection unit configured to detect or sense heat radiated from a human face in proximity to the physical phenomenon detection unit; and
an electronic communication device comprising a control unit, the control unit being in communication with the physical phenomenon detection unit, the electronic communication device configured to:
record an utterance received from a user in response to detecting or sensing the heat radiated from the human face in proximity to the physical phenomenon detection unit; and
provide the recorded utterance to a speech recognition engine for operation thereon;
wherein the user may effectuate operation of the speech recognition engine on the utterance by bringing his or her human face in proximity to the physical phenomenon detection unit; and
wherein the physical phenomenon detection unit is further configured to detect or sense the heat radiated from the human face in proximity to the physical phenomenon detection unit without using key elements of the electronic communication device.

2. The system of claim 1, wherein the speech recognition engine is incorporated into the electronic communication device.

3. The system of claim 1, wherein the physical phenomenon detection unit is incorporated into the electronic communication device.

4. A computer-implemented method of controlling a speech recognition engine, the computer-implemented method comprising:
as implemented at least in part by an electronic communication device comprising a control unit, the control unit being in communication with a physical phenomenon detection unit,
prior to receiving, by the control unit, a signal from the physical phenomenon detection unit indicating that the physical phenomenon detection unit has detected or sensed a predetermined physical phenomenon representative of an intent to invoke operation of the speech recognition engine, receiving an input representative of an intent to place the electronic communication device in a standby state such that subsequent detecting or sensing of the predetermined physical phenomenon is enabled;
receiving, by the control unit, the signal indicating that the physical phenomenon detection unit has detected or sensed the predetermined physical phenomenon representative of the intent to invoke operation of the speech recognition engine, the predetermined physical phenomenon being detected or sensed without using key elements of the electronic communication device;
causing the electronic communication device to record an utterance received from a user in response to receiving the signal; and
providing the recorded utterance to the speech recognition engine for operation thereon;
wherein operation of the speech recognition engine on the utterance is effectuated upon occurrence of the predetermined physical phenomenon.

5. The computer-implemented method of claim 4, wherein the electronic communication device comprises one or more key elements; and wherein the input is received via the one or more key elements.

6. The computer-implemented method of claim 4, wherein the speech recognition engine is incorporated into the electronic communication device.

7. The computer-implemented method of claim 4, wherein the physical phenomenon detection unit is incorporated into the electronic communication device.

8. A non-transitory computer-readable medium having stored thereon a speech recognition control module configured to execute in a control unit of an electronic communication device, the control unit being in communication with a physical phenomenon detection unit comprising a first proximity sensor and a second proximity sensor, the speech recognition control module being further configured to:
detect or sense a first predetermined physical phenomenon via the first proximity sensor without using key elements of the electronic communication device, wherein the first predetermined physical phenomenon is representative of an intent to invoke operation of a speech recognition engine, and wherein operation of the speech recognition engine on the utterance is effectuated upon occurrence of the first predetermined physical phenomenon;
in response to detecting or sensing the first predetermined physical phenomenon, cause the electronic communication device to record an utterance received from a user;
detect or sense a second predetermined physical phenomenon via the second proximity sensor without using key elements of the electronic communication device,
wherein the second predetermined physical phenomenon is representative of an intent to further control the operation of the speech recognition engine;
in response to detecting or sensing the second predetermined physical phenomenon, cause the electronic communication device to cease to record the utterance; and
provide the recorded utterance to the speech recognition engine for operation thereon;
wherein the utterance includes an activated portion recorded after the first predetermined physical phenomenon is detected or sensed but before the second predetermined physical phenomenon is detected or sensed; and
wherein the operation of the speech recognition engine on the utterance is limited to the activated portion of the utterance.

9. The non-transitory computer-readable medium of claim 8, wherein the speech recognition engine is incorporated into the electronic communication device.

10. The non-transitory computer-readable medium of claim 8, wherein the physical phenomenon detection unit is incorporated into the electronic communication device.

* * * * *